United States Patent Office 2,858,291
Patented Oct. 28, 1958

2,858,291

NEW COMPOSITION OF MATTER COMPRISING EPOXY RESIN, LIQUID POLYSULPHIDE POLYMER, AND BUNA-N

Harry H. McAdam, Springfield, Ohio

No Drawing. Application January 23, 1956
Serial No. 560,853

10 Claims. (Cl. 260—45.5)

This invention relates to a new composition of matter, comprising epoxy resin, liquid polysulfide polymer, and Buna N, which has use as a sealing, bonding, and protective agent for electric motors and the like. This application is a continuation-in-part of application Serial Number 386,390, filed October 15, 1953 (now abandoned).

A principal object of this invention is to provide a material suitable for use in impregnating the stator of an electric motor, so as to fill the voids, therein, including the voids through the winding slots and around the wire windings, and to bind and seal these parts together, so that the stator can form a pressure vessel for fluid pumps and compressors, or a principal part thereof, without requiring an additional outer shell. The material may also be used to bond and seal in place the windings of a high speed motor rotor so that they cannot move relatively to the rotor core.

The material of this invention is also suitable for use with an electric motor and the like in order to provide novel protection to the wire windings of the motor stator and the motor rotor.

This new material is impervious and imporous to most fluids, so that it is capable of totally isolating the wire windings by complete encasement, excluding all the detrimental outside substances that tend to react with, dissolve, or break down the wire or its insulation.

Before being cured, this new composition of matter is very flowable, but when it has been cured it is hard and tough, so that it provides protection against mechanical damage that might result from rough handling and the like. It is strong enough to resist shock and is rubbery enough to resist cracking, both mechanically and thermally. Its resilience enables it to compensate for any difference between its temperature coefficient of expansion and those of copper wires and iron stator laminations, so that it will not strain and crack when the motor is heated and cooled. This resilience, in combination with its other qualities, is very important when applied to a motor pump or compressor, such as that disclosed in my co-pending application, Serial Number 279,392, filed March 29, 1952, where the motor stator is used as the pressure vessel. The heating and cooling of the iron laminations and copper wire windings in such a stator creates alternate tension and pressure on any material used to bond and seal them together. This tension and pressure has been sufficient to break the seal in all bonding materials heretofore known to me and sought to be used for this purpose. I have found that the matching (by fillers and the like) of the temperature coefficient of expansion of the bonding insulating agent to that of iron or copper is not sufficient, due to the difference in the expansion of iron and copper. But my new composition overcomes this difficulty by providing the needed tough rubbery resilience that resists these forces of compression and tension and maintains the seal.

Other objects and advantages of the invention will appear from the following description of a preferred embodiment, given in accordance with 35 U. S. C. 112.

Basically, the invention is a combination of an epoxy-type polymer, a Buna-N polymer, a polysulfide ploymer and suitable catalyst.

The base of the composition is the epoxy-type polymer, which forms epoxide resins when cured. "Epoxy-polymer" is an abbreviated term for the reaction products of polyfunctional halohydrins (e. g., epichlorhydrin) with polyhydric alcohols and/or phenols (e. g., bisphenol A) to produce glycidyl polyethers, such as the glycidyl polyethers of dihydric phenols. The typical formula is usually represented as:

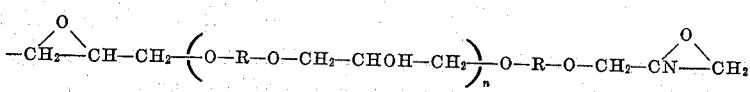

where R in the phenolic type of epoxide polymer represents the divalent hydrocarbon radical of the dihydric phenol, e. g.,

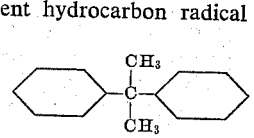

and where $n$ is an integer of the series 0, 1, 2, 3, etc. The name epoxy-type polymer, used in general trade, refers to the presence of epoxy groups of the type

For further information reference may be had to Patent No. 2,500,600, issued March 14, 1950, to Bradley and Patent No. 2,602,785, issued July 8, 1952, to Wiles and Elam. Several suitable polymers or resins of this type are available on the market, such as the resins manufactured by Shell Chemical Corporation and sold under the trademark Epon. One suitable material is Epon 828. At normal temperatures Epon 828 is a viscous amber liquid having an epoxide equivalent (grams of resin containing one gram-equivalent of epoxide) of between 190 and 210. It weighs about 10.27 pounds per gallon, has a refractive index at 20° C. of 1.573, has a Gardner-Holdt viscosity of $Z_5$-$Z_6$+ when solid, and has an equivalent weight (the number of grams of resin required to completely esterify one gram-mole of monobasic acid; e. g., 280 grams of $C_{18}$ fatty acid or 60 grams of acetic acid) of 85. Referring to the formula given above, $n$ is approximately 1.

With the epoxide resin I combine a Buna-N rubber, a rubbery copolymer of butadiene and acrylonitrile, often referred to by the trademark Hycar. This substance may contain various age inhibitors, stabilizers, fillers, etc., which are well known in the art. I prefer to use it already fully cured and in the subdivided state, e. g., about fifty mesh.

The third important element of my new composition is a mercaptan-terminated liquid polysulfide polymer. Preferably, this has a low degree of cross linking and a viscosity of about 7–12 poises. Such a product may be that sold by Thiokol Corporation under the trademark Thiokol LP-3. Before cure, the polysulfide polymer is liquid at room temperature and may be described as a polythiopolymercaptan (see Patent No. 2,466,963, issued April 12, 1949, to Patrick and Ferguson). "Thiokols" LP-3, LP-2, and LP-8 are obtained by reacting the condensation product of sodium polysulfide with a mixture of 98% (mole) dichloroethyl formal and 2% (mole) trichloropropane, a reductive cleavage of the polysulfide resulting in the desired liquid which can, with proper catalysts, be converted by oxidation into a tough rubbery solid. The compounds of this "LP" series differ in their molecular weight and viscosity over a wide range, so that LP-3 (with a molecular weight of about 1000 and a viscosity of 10 poises) is preferred for use with electric motors. (See the article, "Polysulfide Liquid Polymers" by J. S. Jorczak and E. M. Fettes in "Industrial and Engineering Chemistry," vol. 43, No. 2, February 1951, pages 324-328.)

The fourth main ingredient is a curing catalyst, preferably an aliphatic heterocyclic or aromatic amine. Suitable catalysts, in descending order of activity, are tridimethylaminomethyl-phenol, diethylenetriamine, dimethyl-aminomethyl-phenol, benzyldimethylamine, piperidine, diethylamine, dimethylamino-propionitrile, and pyridine. Dicyanamide is another, and preferred, catalyst.

Two preferred compositions and their preparation follow:

EXAMPLE I

Part A

| | G. |
|---|---|
| Eoxy-type polymer (Epon 828) | About 800 |
| Buna-N (as above), 50 mesh | About 360 |

These two elements are mixed together hot, being heated in an oven to between 150° F. and 350° F., preferably about 250° F. After mixing, they are preferably allowed to stand several hours so that the fine 50-mesh Buna-N particles become thoroughly wetted by the liquid epoxy. There is no reaction between the epoxy and the Buna-N.

Part B

| | G. |
|---|---|
| Liquid polythiopolymercaptan ("Thiokol" LP-3) | About 200 |
| Catalyst (aromatic or aliphatic amine) | About 84 |

The polythiopolymercaptan is unaffected by the catalyst at the ambient temperature, but will be cured both in the presence of the epoxy polymer and heat.

These two elements are mixed together at the ambient temperature. Then Part B is added to Part A at about 115° F., and the mixture is stirred vigorously for about 5 minutes. Cure may be made by baking at between 125° F. and 200° F., preferably about 175° F. for between 3 to 8 hours. During this period it is a viscous liquid and may be added to the metal or other article to be coated, impregnated, bonded, etc. At the end of this period it has polymerized and cooled into a tough brown hard rubbery solid, impervious to acids, freon, oil, water, salt water and most other fluids.

EXAMPLE II

Part A

| | G. |
|---|---|
| Epoxy-type polymer (Epon 828) | About 620 |
| Buna N (as above), 50 mesh | About 279 |

These two elements are mixed together hot, being heated in an oven to between 225° F. and 275° F., preferably about 250° F. After mixing they are preferably allowed to stand several hours, as in Example I.

Part B

| | G. |
|---|---|
| Liquid polythiopolymercaptan (Thiokol LP-3) | About 136 |
| Catalyst (aromatic or aliphatic amine) | About 65 |

These two elements are mixed together at ambient temperature. Part A is then reheated to between about 115° F. and 125° F., and Part B is added to Part A, and mixed thoroughly for about 5 minutes. This mixture is then evacuated to a pressure below 20 inches vacuum for 10 minutes to remove any moisture or noncondensable gases. Pot life of the mixture at 120° F., is about 3 hours, and up to this point, about 15 minutes has been consumed. The next step is injection of the part to be processed.

An autoclave containing the part has been heated to 170° F. to 180° F., and evacuated to 1 mm. pressure prior to the preparation of the plastic mix. A hydraulic injection pump is filled with the plastic mix at 120° F. and injection is started, the plastic being forced into the autoclave at 175° F. The autoclave starting pressure is 1 mm. which is rapidly raised to about 5000 p. s. i., in about 5 minutes. The 5000 p. s. i. is maintained on the autoclave and part continuously for about 30 minutes or until the jellation period of the mix has been reached. During this jellation period chemical shrinkage accounts for a reduction of plastic volume. The injection pump is operated to keep the autoclave pressure up to 5000 p. s. i., adding additional plastic to compensate shrinkage.

The autoclave is maintained at 170° F. to 180° F., for a period of 3 hours after the 30 minutes jellation period to complete plastic polymerization. After curing, the part is removed, it is now impregnated with tough, brown, hard, rubbery solid, impervious to acids, Freon, oil, water, salt water and most other liquids.

The formulas in the preceding examples appear to give the best results in electric motor applications. Proportions may be varied for various applications, but for electric motor encasement etc., I have found it best to keep the proportions within the following ranges by weight:

| | | Parts |
|---|---|---|
| Epoxy-type polymer (Epon 828) | About | 50-60 |
| Buna-N | About | 20-30 |
| Liquid polythiopolymercaptan | About | 10-15 |
| Catalyst (e. g. dicyandiamide) | About | 5.25-6.30 |

The subdivided Buna-N has a great effect on the resiliency of the finished product; for best results it is well to use about as much as can be completely wetted by the epoxy when mixed at 250° F., which is about the middle of range indicated above. Too little Buna-N rubber below the lower end of the range reduces the resiliency and this reduction may result in cracking of the solid when subjected to thermal conditions like those existing in electric motors.

The polythiopolymercaptan acts to soften the epoxy polymer so that it can conform to the resiliency factor supplied by the Buna-N. Too little of the polythiopolymercaptan will result in a matrix body lacking flexibility permitting deflection of the rubber particles, and mechanical and thermal cracking may result. However, polythiopolymercaptans are subject to cold flow, and too much of this ingredient in the presence of the hard epoxy polymer tends to result in deformation of the plastic encasement.

Balancing these several factors, as shown in the foregoing examples, results in the most stable product.

To those skilled in the art to which this invention relates, many changes in specific formulation and widely differing embodiments and applications of the invention will suggest themselves without departing from the spirit and scope of the invention. The disclosures and the description herein are purely illustrative and are not intended to be in any sense limiting.

I claim:

1. The combination of a glycidyl polyether of a polyhydric phenol, rubbery copolymer of butadiene and acrylonitrile, and polythiopolymercaptan liquid at room temperature, said composition made up of about 50-60 parts of said glycidyl polyether of a dihydric phenol; 20-30 parts of said rubbery copolymer, and 10-15 parts of said polythiopolymercaptan.

2. The composition comprising (a) the reaction product of a glycidyl polyether of a dihydric phenol, (b) rubbery butadiene-acrylonitrile copolymer, and (c) polythiopolymercaptan liquid at room temperature, said composition made up of about 50-60 parts of said glycidyl polyether of a dihydric phenol; 20–30 parts of said rubbery copolymer, and 10–15 parts of said polythiopolymercaptan.

3. The composition comprising the intimate mixture of (a) the uncured, liquid, reaction product of a glycidyl polyether of a dihydric phenol, (b) cured, subdivided, rubbery butadiene-acrylonitrile copolymer, and (c) uncured polythiopolymercaptant liquid at room temperature said composition made up of about 50–60 parts of said glycidyl polyether of a dihydric phenol; 20–30 parts of said rubbery copolymer, and 10–15 parts of said polythiopolymercaptan.

4. The composition comprising the intimate mixture of (a) the uncured, liquid, reaction product of a glycidyl polyether of a dihydric phenol, (b) cured, subdivided, rubbery butadiene-acrylonitrile copolymer, (c) uncured polythiopolymercaptan liquid at room temperature and (d) an amine curing agent for (a), said composition being solidified by the curing of components (a) and (c) after mixture with the other ingredients said composition made up of about 50–60 parts of said glycidyl polyether of a dihydric phenol; 20–30 parts of said rubbery polymer; 10–15 parts of said polythiopolymercaptan and 5.25–6.3 parts of amine curing catalyst.

5. A composition of matter, comprising an intimate mixture of a glycidyl polyether of a dihydric phenol, an amine curing agent therefor, subdivided rubbery butadiene-acrylonitrile copolymer, and polythiopolymercaptan liquid at room temperature said composition made up of about 50–60 parts of said glycidyl polyether of a dihydric phenol; 20–30 parts of said rubbery polymer; 10–15 parts of said polythiopolymercaptan and 5.25–6.3 parts of amine curing catalyst.

6. A composition of matter comprising the reaction product of epichlorhydrin and dihydric phenol intimately mixed with an amine curing agent therefor, subdivided, rubbery butadiene-acrylonitrile copolymer, and polythiopolymercaptan liquid at room temperature said composition made up of about 50–60 parts of said glycidyl polyether of a dihydric phenol; 20–30 parts of said rubbery polymer; 10–15 parts of said polythiopolymercaptan and 5.25–6.3 parts of amine curing catalyst.

7. A composition of matter for use as a bonding, impregnating, and sealing material including in combination: a major portion of a glycidyl polyether of a dihydric phenol; a minor portion of a rubbery copolymer of butadiene and acrylonitrile; a minor portion of a polythiopolymercaptan liquid at room temperature; and an amine catalyst for curing said polyether, said composition made up of about 50–60 parts of said glycidyl polyether of a dihydric phenol; 20–30 parts of said rubbery polymer; 10–15 parts of said polythiopolymercaptan and 5.25–6.3 parts of amine curing catalyst.

8. A composition of matter for use in sealing and protecting electric motors and the like consisting of about 57% of a glycidyl polyether of a dihydric phenol, about 25% of a rubbery copolymer of butadiene and acrylonitrile, about 13% of a polythiopolymercaptan liquid at room temperature, and the remainder of an amine catalyst for curing said polyether.

9. A composition of matter for use in sealing and protecting electric motors and the like, consisting of about 57% of a glycidyl polyether of a dihydric phenol; about 25% of a subdivided, rubbery copolymer of butadiene and acrylonitrile, about 13% of a polythiopolymercaptan liquid at room temperature, and the remainder of an amine curing catalyst for said polyether, cured under high temperature conditions into a tough solid, thermosetting substance.

10. A composition of matter for use in sealing and encasing electric motors and the like, comprising about 50 to 60 parts by weight of a glycidyl polyether of a dihydric phenol; about 20 to 30 parts by weight of a subdivided rubbery copolymer of butadiene and acrylonitrile; about 10 to 15 parts by weight of a polythiopolymercaptan liquid at room temperature; and about 5.25 to 6.30 parts by weight of dicyandiamide; the stated ingredients being well mixed and cured at an elevated temperature into a tough, solid, thermosetting substance.

References Cited in the file of this patent

UNITED STATES PATENTS

| | | |
|---|---|---|
| 2,080,363 | Stocklin et al. | May 11, 1937 |
| 2,466,963 | Patrick et al. | Apr. 12, 1949 |

OTHER REFERENCES

Jorczak et al.: India Rubber World, April 1954, pages 66–69.

Narracott: British Plastics, October 1951, pages 341–45.